United States Patent
Jeon et al.

(10) Patent No.: US 11,834,543 B2
(45) Date of Patent: Dec. 5, 2023

(54) POLYMER COAGULANT AND GRAFT COPOLYMER COMPRISING SAME

(71) Applicant: LG CHEM, LTD., Seoul (KR)

(72) Inventors: Hee Jung Jeon, Daejeon (KR); Geon Soo Kim, Daejeon (KR); Moon Ja Hwang, Daejeon (KR); Hyung Joon Kim, Daejeon (KR); Chang Hoe Kim, Daejeon (KR); Min Su Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 273 days.

(21) Appl. No.: 17/421,273

(22) PCT Filed: Apr. 27, 2020

(86) PCT No.: PCT/KR2020/005529
§ 371 (c)(1),
(2) Date: Jul. 7, 2021

(87) PCT Pub. No.: WO2020/222482
PCT Pub. Date: Nov. 5, 2020

(65) Prior Publication Data
US 2021/0395403 A1 Dec. 23, 2021

(30) Foreign Application Priority Data

Apr. 29, 2019 (KR) .................. 10-2019-0049959

(51) Int. Cl.
*C08F 6/22* (2006.01)
*C08F 279/02* (2006.01)
*C08F 279/04* (2006.01)

(52) U.S. Cl.
CPC .............. *C08F 6/22* (2013.01); *C08F 279/02* (2013.01); *C08F 279/04* (2013.01)

(58) Field of Classification Search
CPC .................................................. C08F 279/02
See application file for complete search history.

(56) References Cited

U.S. PATENT DOCUMENTS

| 4,419,496 A | 12/1983 | Henton et al. |
| 5,631,323 A | 5/1997 | Guntherberg et al. |
| 2015/0065651 A1* | 3/2015 | Takamido ................ C08F 6/22 525/286 |
| 2018/0044443 A1 | 2/2018 | Walker et al. |
| 2018/0094176 A1* | 4/2018 | Okamoto ............... C09J 175/08 |
| 2018/0142094 A1 | 5/2018 | Kang |

FOREIGN PATENT DOCUMENTS

| CA | 1056975 A | 6/1979 |
| CN | 107531912 A | 1/2018 |
| DE | 2427960 B1 | 6/1975 |
| EP | 0 390 144 A2 | 10/1990 |
| EP | 0899281 * | 3/1999 |
| JP | S5614545 A | 2/1981 |
| JP | H08253641 A | 10/1996 |
| JP | 2002348436 A | 12/2002 |
| KR | 10-1991-0002472 A | 2/1991 |
| KR | 10-1994-0010341 B1 | 10/1994 |
| KR | 10-1995-0005861 A | 3/1995 |
| KR | 10-2004-0014765 A | 2/2004 |
| KR | 10-2011-0075756 A | 7/2011 |
| KR | 10-1432633 B1 | 8/2014 |

OTHER PUBLICATIONS

Lutz et al., electronic translation of EP 0899281, Mar. 1999.*
Extended European Search Report for related application No. EP 20798515.1, dated Jun. 3, 2022.
The Office Action for Indian Patent Application No. 202117031613, dated Jan. 2, 2023.

* cited by examiner

*Primary Examiner* — Jeffrey C Mullis

(57) ABSTRACT

The present invention relates to a polymer coagulant including methacrylamide in a preferred range and an enlarged graft copolymer prepared using same. The polymer coagulant provided in the present invention may enlarge a conjugated diene-based polymer to a suitable particle diameter range, and there are advantages of achieving excellent impact resistance and flowability of a graft copolymer prepared from the polymer.

11 Claims, No Drawings

POLYMER COAGULANT AND GRAFT COPOLYMER COMPRISING SAME

CROSS-REFERENCE TO RELATED APPLICATIONS

This application is National Phase of International Application No. PCT/KR2020/005529 filed on Apr. 27, 2020, which claims the benefit of Korean Patent Application No. 10-2019-0049959, filed on Apr. 29, 2019, in the Korean Intellectual Property Office, the disclosures of which are incorporated herein in their entirety by reference.

TECHNICAL FIELD

The present invention relates to a polymer coagulant which may be used for preparing a graft copolymer having excellent impact resistance and flowability, and a graft copolymer including same.

BACKGROUND ART

An acrylonitrile-butadiene-styrene copolymer (ABS copolymer) is a thermoplastic copolymer and is prepared by performing graft copolymerization of styrene and acrylonitrile to a butadiene rubber polymer.

An ABS copolymer has excellent physical properties of high impact resistance, chemical resistance, thermal stability, coloration properties, fatigue resistance, rigidity, processability, etc., compared with the conventional high-impact polystyrene (HIPS), and among them, processability is particularly excellent. Due to such properties, the ABS copolymer may be used in the interior or exterior materials of cars, parts of office machines and various electric and electronic goods, toys, etc.

Meanwhile, in order to prepare an ABS copolymer having excellent impact resistance, the particle diameter of a diene-based rubber polymer is required to suitably control, and in general, in case where an average particle diameter is 0.25 to 0.5 μm, excellent impact resistance may be achieved without degrading surface gloss properties. However, if a diene-based rubber polymer having the aforementioned average particle diameter is prepared by emulsion polymerization, polymerization time is too long, and productivity is reduced. Accordingly, a method of preparing a diene-based rubber polymer having an average particle diameter of about 0.1 μm and then, enlarging the diene-based rubber polymer using a coagulant has been suggested. However, in case of using acetic acid as the coagulant during enlarging, an excessive amount of an aggregate was produced, and in case of reducing the concentration of the diene-based rubber polymer latex to reduce the generation of the aggregate, there were problems of degrading productivity. In addition, in case of using an acrylate-based polymer as the coagulant, a significant amount of the polymer coagulant remains in a finally prepared ABS copolymer, and the improvement of processability is limited.

Accordingly, the development of a polymer coagulant which may suppress the generation of an aggregate, improve processability and also improve physical properties including impact resistance is required.

PRIOR ART DOCUMENTS (Patent Document 1) KR 10-1432633
(Patent Document 2) KR 20040014765A

DISCLOSURE OF THE INVENTION

Technical Problem

An object of the present invention is to provide a polymer coagulant which may suppress the production of an aggregate during enlarging and may improve the impact resistance and flowability of a final graft copolymer prepared after enlarging.

Technical Solution

In order to solve the task, the present invention provides a polymer coagulant including a conjugated diene-based polymer core and a shell including a derived unit from ethyl acrylate and a derived unit from methacrylamide, wherein the shell includes the derived unit from ethyl acrylate and the derived unit from methacrylamide in a weight ratio of 92:8 to 83:17.

In addition, the present invention provides a method for preparing an enlarged graft copolymer, including injecting the polymer coagulant to a conjugated diene-based polymer and enlarging (S1), and performing graft polymerization of a vinyl cyan-based monomer and an aromatic vinyl-based monomer to the enlarged conjugated diene-based polymer (S2).

Advantageous Effects

The polymer coagulant of the present invention may enlarge a conjugated diene-based polymer to a suitable particle diameter range and may contribute to the improvement of the impact resistance and flowability of a graft copolymer prepared from an enlarged conjugated diene-based polymer.

BEST MODE FOR CARRYING OUT THE INVENTION

Hereinafter, preferred embodiments of the present invention will be described in more detail to assist the understanding of the present invention. However, the embodiments below are only illustrations of the present invention and are not intend to limit the scope of the present invention.

Preparation Example 1

To a nitrogen-substituted polymerization reactor, 76.4 parts by weight of ion exchange water, and 75 parts by weight of polybutadiene having a particle diameter of 1000 Å were injected, and the temperature was elevated to 80° C. while stirring for 30 minutes. Then, a mixture of 21.2 parts by weight of an ethyl acrylate monomer and 3.8 parts by weight of a methacrylamide monomer, 0.15 parts by weight of sodium dodecylbenzene sulfonate (SDBS) and 0.2 parts by weight of potassium persulfate (KPS) were continuously injected at 80° C. over 1 hour to perform graft polymerization, and the polymerization was finished at a point where a polymerization conversion ratio reached 98% to prepare Polymer Coagulant A.

Preparation Example 2

Polymer Coagulant B was prepared by conducting the same method in Preparation Example 1 except for using 21.9 parts by weight of ethyl acrylate and 3.1 parts by weight of methacrylamide as monomers.

Preparation Example 3

Polymer Coagulant C was prepared by conducting the same method in Preparation Example 1 except for using 22.5 parts by weight of ethyl acrylate and 2.5 parts by weight of methacrylamide as monomers.

Comparative Preparation Example 1

Polymer Coagulant D was prepared by conducting the same method in Preparation Example 1 except for using 23.1 parts by weight of ethyl acrylate and 1.9 parts by weight of methacrylamide as monomers.

Comparative Preparation Example 2

Polymer Coagulant E was prepared by conducting the same method in Preparation Example 1 except for using 20.6 parts by weight of ethyl acrylate and 4.4 parts by weight of methacrylamide as monomers.

Comparative Preparation Example 3

Polymer Coagulant F was prepared by conducting the same method in Preparation Example 1 except for using 80 parts by weight of polybutadiene, and 18 parts by weight of ethyl acrylate and 2 parts by weight of methacrylic acid as monomers.

Comparative Preparation Example 4

Polymer Coagulant G was prepared by conducting the same method in Preparation Example 1 except for using 50 parts by weight of an ethyl acrylate polymer instead of polybutadiene as a core, and 41 parts by weight of ethyl acrylate and 9 parts by weight of methacrylic acid as monomers.

The components of the polymer coagulants prepared in the Preparation Examples and Comparative Preparation Examples are summarized and shown in Table 1 below.

TABLE 1

| | | | Polymer coagulant component | | | | |
|---|---|---|---|---|---|---|---|
| | | Core/shell weight | Core component (parts by weight) | | Shell component (parts by weight) | | |
| | Type | ratio | PBL | EA | EA | MAM | MAA |
| Preparation Example 1 | A | 75/25 | 75 | — | 21.2 | 3.8 | — |
| Preparation Example 2 | B | 75/25 | 75 | — | 21.9 | 3.1 | — |
| Preparation Example 3 | C | 75/25 | 75 | — | 22.5 | 2.5 | — |
| Comparative Preparation Example 1 | D | 75/25 | 75 | — | 23.1 | 1.9 | — |
| Comparative Preparation Example 2 | E | 75/25 | 75 | — | 20.6 | 4.4 | — |
| Comparative Preparation Example 3 | F | 80/20 | 80 | — | 18 | — | 2 |
| Comparative Preparation Example 4 | G | 50/50 | — | 50 | 41 | — | 9 |

(PBL: polybutadiene, EA: ethyl acrylate, MAM: methacrylamide, MAA: methacrylic acid)

Example 1

While stirring 60 parts by weight of a butadiene rubber polymer with a particle diameter of 1000 Å, the temperature was elevated to 50° C., and 1.32 parts by weight of Polymer Coagulant A prepared in Preparation Example 1 was injected and stirred for 15 minutes to enlarge the particle diameter of the butadiene polymer to 3000 Å. The particle diameter of the enlarged butadiene polymer was measured and was 2780 Å. Then, 30 parts by weight of a styrene monomer, 10 parts by weight of an acrylonitrile monomer, 0.12 parts by weight of cumene hydroperoxide (CHP), and 0.34 parts by weight of tertiary dodecyl mercaptan (TDM) were continuously injected over 3 hours for graft polymerizing monomers to prepare an enlarged graft copolymer. The graft copolymer latex thus prepared was coagulated with $MgSO_4$ and washed to obtain as a particulate material. This particulate material and a SAN copolymer were put in a mixer and mixed and extruded to obtain a pellet.

Example 2

A particulate material and a pellet were obtained by conducting the same method as in Example 1 except for using Polymer Coagulant B. The particle diameter of an enlarged butadiene polymer was measured and was 2690 Å.

Example 3

A particulate material and a pellet were obtained by conducting the same method as in Example 1 except for using Polymer Coagulant C. The particle diameter of an enlarged butadiene polymer was measured and was 2620 Å.

Comparative Example 1

A particulate material and a pellet were obtained by conducting the same method as in Example 1 except for using Polymer Coagulant D. The particle diameter of an enlarged butadiene polymer was measured and was 1980 Å.

Comparative Example 2

The same method as in Example 1 was conducted except for using Polymer Coagulant E. In case of using Polymer Coagulant E, aggregating phenomenon occurred during enlarging, and a graft copolymer was not obtained.

Comparative Example 3

A particulate material and a pellet were obtained by conducting the same method as in Example 1 except for using 58 parts by weight of a butadiene rubber polymer and 2 parts by weight of Polymer Coagulant F. The particle diameter of an enlarged butadiene polymer was measured and was 2830 Å.

Comparative Example 4

A particulate material and a pellet were obtained by conducting the same method as in Example 1 except for using 58 parts by weight of a butadiene rubber polymer and 2 parts by weight of Polymer Coagulant G. The particle diameter of an enlarged butadiene polymer was measured and was 2930 Å.

The graft copolymers prepared in the Examples and Comparative Examples are summarized and shown in Table 2 below.

TABLE 2

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Polymer Coagulant | A | B | C | D | E | F | G |
| Butadiene rubber latex content | 60 | 60 | 60 | 60 | 60 | 58 | 58 |
| Polymer coagulant content | 1.32 | 1.32 | 1.32 | 1.32 | 1.32 | 2 | 2 |
| Enlarged rubber particle diameter (Å) | 2780 | 2690 | 2620 | 1980 | Aggregated during enlarging | 2830 | 2930 |

From Table 2 above, it could be confirmed that the polymer coagulant including methacrylamide of the present invention may enlarge the particle diameter of a butadiene rubber polymer in a suitable range like the conventional polymer coagulant including methacrylic acid. In addition, it could be confirmed that if the methacrylamide content in the polymer coagulant including methacrylamide deviates from the range of the present invention, the butadiene rubber polymer could not be enlarged, or though being enlarged, the effects thereof were insufficient.

EXPERIMENTAL EXAMPLES—CONFIRMATION OF PHYSICAL PROPERTIES OF PARTICULATE MATERIALS AND PELLETS

The physical properties of the particulate materials and pellets prepared in the Examples and Comparative Examples were measured using methods as follows.

Flow index (MI, g/10 min): measured under conditions of 220° C. and 10 kg based on ASTM D1238.

Izod impact strength (IMP, kgfcm/cm): measured after making a notch on a pellet specimen having a thickness of ¼ inch based on ASTM D256.

Physical property values measured by the methods above are summarized in Table 3 below.

TABLE 3

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| MI | 21.0 | 19.9 | 21.4 | 16.5 | Aggregation phenomenon during enlarging | 19.8 | 17.1 |
| IMP (¼″) | 27.1 | 27.5 | 27.0 | 10.9 |  | 25.0 | 25.3 |

From Table 3 above, it was confirmed that the graft copolymers enlarged through the polymer coagulant of the present invention showed better flow index and impact strength than the graft copolymers (Comparative Examples 3 and 4) enlarged through a polymer coagulant including methacrylic acid. In addition, in the polymer coagulant including methacrylamide, if the methacrylamide content deviated from the range of the present invention, the enlarging itself was impossible, or enlarging effects were insignificant, and accordingly, the physical properties of a graft copolymer prepared thereby were also inferior.

MODE FOR CARRYING OUT THE INVENTION

Hereinafter, the present invention will be explained in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the particle diameter of the conjugated diene-based polymer and enlarged graft copolymer may be measured using a dynamic light scattering method, and particularly, may be measured using a Nicomp 380 apparatus (product name, manufacturer: Nicomp).

In the disclosure, a "particle diameter" may mean an arithmetic average particle diameter in particle size distribution, i.e., scattering strength average particle diameter measured by a dynamic light scattering method.

Polymer Coagulant

The present invention provides a polymer coagulant including a conjugated diene-based polymer core, and a shell including a derived unit from ethyl acrylate and a derived unit from methacrylamide, wherein the shell includes the derived unit from ethyl acrylate and the derived unit from methacrylamide in a weight ratio of 92:8 to 83:17.

The polymer coagulant of the present invention may have a core-shell shape of a conjugated diene-based polymer core and a shell including a derived unit from ethyl acrylate and a derived unit from methacrylamide. If the polymer coagulant has such a core-shell shape, advantages of excellent enlarging efficiency may be achieved when compared with a polymer coagulant having the same monomer content but does not having a core-shell shape.

In the polymer coagulant of the present invention, the shell may be formed by grafting ethyl acrylate and methacrylamide to a conjugated diene-based polymer core. In the conventional technique, a graft copolymer obtained by grafting ethyl acrylate and methacrylic acid to a conjugated diene-based polymer was used as a polymer coagulant, but the inventors of the present invention found that if methacrylamide including amide is included instead of methacrylic acid in a shell in the polymer coagulant, the physical properties, particularly, flowability and impact resistance of an enlarged graft copolymer finally prepared could be improved even further, and completed the present invention.

In the polymer coagulant of the present invention, the conjugated diene-based polymer included in the core is prepared by emulsion polymerization, particularly, crosslinking reaction of a diene-based monomer and may have a latex type. The diene-based monomer may be one or more selected from the group consisting of 1,3-butadiene, isoprene, chloroprene and piperylene, and among them, 1,3-butadiene may be preferable.

The conjugated diene-based polymer may have a particle diameter of 500 to 1500 Å, preferably, 800 to 1200 Å. If the aforementioned range is satisfied, a suitable particle diameter may be obtained in case of being enlarged, and latex stability may also be excellent.

In the polymer coagulant of the present invention, an ethyl acrylate monomer and a methacrylamide monomer may be injected continuously or in installments during performing grafting of ethyl acrylate and methacrylamide to a conjugated diene-based polymer. In case of injecting the monomers continuously or in installments, uniform grafting polymerization results may be obtained when compared with a case of injecting in batch.

In the polymer coagulant of the present invention, the injection temperature of the monomers may be 60 to 100° C., preferably, 70 to 90° C. If the monomers are injected in the temperature range and grafted, two monomers may be uniformly mixed, and uniform grafting may be achieved.

In the polymer coagulant of the present invention, the weight ratio of the core and the shell may be 70:30 to 80:20, preferably, 73:27 to 77:23. If the core is included in a less amount than the lower limit, latex may be coagulated during enlarging, and if the core is included in a greater amount than the upper limit, enlarging may be insufficiently performed.

In the polymer coagulant of the present invention, the weight ratio of the derived unit from ethyl acrylate and the derived unit derived from methacrylamide, included in the shell, may be 92:8 to 83:17, preferably, 90:10 to 85:15. If the derived unit from ethyl acrylate and the derived unit from methacrylamide are included in the weight ratio, the impact resistance and flowability of an enlarged graft copolymer prepared may be improved even further.

Enlarged Graft Copolymer

The present invention provides an enlarged graft copolymer including the polymer coagulant, a conjugated diene-based polymer, a derived unit from a vinyl cyan-based monomer, and a derived unit from an aromatic vinyl-based monomer.

In the enlarged graft copolymer of the present invention, the polymer coagulant plays the role of coagulating and enlarging the conjugated diene-based polymer. To the conjugated diene-based polymer enlarged through the polymer coagulant, a vinyl cyan-based monomer and an aromatic vinyl-based monomer may be grafted to prepare an enlarged graft copolymer to be provided in the present invention.

The particle diameter of the enlarged graft copolymer of the present invention may be from 2500 to 3500 Å, preferably, from 2800 to 3200 Å. If a copolymer prepared through enlarging and grafting has a particle diameter in such a range, excellent impact resistance may be achieved without deteriorating surface gloss properties.

In the present invention, the vinyl cyan-based monomer may be one or more selected from the group consisting of acrylonitrile, methacrylonitrile, ethacrylonitrile, phenylacrylonitrile and α-chloroacrylonitrile, and among them, acrylonitrile is preferable. In the present invention, the vinyl cyan-based derived unit may mean a unit derived from a vinyl cyan-based monomer.

In the present invention, the aromatic vinyl-based monomer may be one or more selected from the group consisting of styrene, α-methyl styrene, α-ethyl styrene and p-methyl styrene, and among them, styrene is preferable. In the present invention, the aromatic vinyl-based derived unit may mean a unit derived from an aromatic vinyl-based monomer.

In the present invention, the polymer coagulant may be included in 1 to 4 parts by weight, preferably, 2 to 3 parts by weight with respect to 100 parts by weight of the conjugated diene-based polymer. If the polymer coagulant is included in a greater amount than the upper limit, the amount of the polymer coagulant is greater considering enlargement degree necessary, and it is uneconomical, or enlargement degree is excessive considering enlargement degree necessary, and an enlarged graft copolymer having a desired particle diameter may not be prepared. If the polymer coagulant is included in a less amount than the lower limit, the enlarging of the conjugated diene-based polymer may become insufficient.

In the present invention, the derived unit from a vinyl cyan-based monomer may be included in 10 to 25 parts by weight, preferably, 15 to 20 parts by weight, and the derived unit from an aromatic vinyl-based monomer may be included in to 60 parts by weight, preferably, 45 to 55 parts by weight with respect to 100 parts by weight of the conjugated diene-based polymer. If the derived unit from a vinyl cyan-based monomer and the derived unit from an aromatic vinyl-based monomer are included in less amounts than the lower limits, impact strength may be markedly reduced, and if the amounts included thereof are greater than the upper limit, flowability may be deteriorated.

Method for Preparing Enlarged Graft Copolymer

The present invention provides a method for preparing an enlarged graft copolymer, including injecting the polymer coagulant to a conjugated diene-based polymer and enlarging (S1), and performing graft polymerization of a vinyl cyan-based monomer and an aromatic vinyl-based monomer to the enlarged conjugated diene-based polymer (S2).

In the method for preparing an enlarged graft copolymer of the present invention, the step S1 is a step for coagulating and enlarging a conjugated diene-based polymer using a polymer coagulant. The enlarging may be performed by mixing and stirring the polymer coagulant and the conjugated diene-based polymer and may be performed at a temperature of 30 to 70° C., preferably, 40 to 60° C. If the enlarging is performed under such conditions, uniform enlarging of the conjugated diene-based polymer may be achieved.

The conjugated diene-based polymer enlarged in the step S1 may have a particle diameter of 2500 to 3500 Å, preferably, 2800 to 3200 Å. If the enlarged conjugated diene-based polymer has such a particle diameter, the enlarged graft copolymer finally prepared may also have the aforementioned particle diameter.

The step S2 is a step of injecting a vinyl cyan-based monomer and an aromatic vinyl-based monomer and performing graft polymerization to the enlarged conjugated diene-based polymer as a core. The monomers may be injected continuously or in installments, and if injecting is performed continuously or in installments, uniform grafting may be achieved when compared with a case of injecting in batch. In addition, in the step S2, an additive such as an emulsifier, a polymerization initiator, a molecular weight controlling agent, and an activator and water may be injected together with the monomer, and the polymerization may be performed.

The emulsifier may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecyl benzene sulfate, sodium octadecyl sulfate, sodium oleic sulfate, sodium dodecyl sulfate, potassium octadecyl sulfate, potassium rosinate and sodium rosinate, and among them, sodium dodecyl benzene sulfonate is preferable.

The emulsifier may preferably be injected in 0.1 to 2 parts by weight with respect to 100 parts by weight of the sum of the diene-based rubber polymer, the aromatic vinyl-based monomer and the vinyl cyan-based monomer. If the aforementioned range is satisfied, the particle diameter of the enlarged graft copolymer thus prepared may be suitable, and the generation of aggregation may be minimized.

The kind of the polymerization initiator may be one or more selected from the group consisting of sodium persulfate, potassium persulfate, ammonium persulfate, potassium perphosphate, hydrogen peroxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butyl peroxy isobutyrate, azobisisobutyronitrile, azobis-2,4-dimethylvaleronitrile, azobiscyclohexanecarbonitrile, and azobisisobutyric acid (butyl acid) methyl. The polymerization initiator may be injected in 0.01 to 1 parts by weight or 0.05 to 0.5 parts by weight with respect to 100 parts by weight of the sum of the diene-based rubber polymer, the aromatic vinyl-based monomer and the vinyl cyan-based monomer, and among them, preferable injection amount is from 0.05 to 0.5 parts by weight. If the aforementioned range is satisfied, a diene-based graft copolymer having excellent impact resistance may be prepared.

The molecular weight controlling agent may be one or more selected from the group consisting of α-methylstyrene dimer, t-dodecyl mercaptan, n-dodecyl mercaptan, n-octyl mercaptan, carbon tetrachloride, methylene chloride, methylene bromide, tetraethyl thiuram disulfide, dipentamethylene thiuram disulfide and diisopropyl xanthogen disulfide, and among them, t-dodecyl mercaptan is preferable. The molecular weight controlling agent may be injected in 0.01 to 1.5 parts by weight or 0.1 to 1 parts by weight with respect to 100 parts by weight of the total of the diene-based rubber polymer, the aromatic vinyl-based monomer and the vinyl cyan-based monomer, and among them, 0.1 to 1 parts by weight may be preferably injected. If the aforementioned range is satisfied, a diene-based graft copolymer having excellent balance between flow index and impact strength may be prepared.

The activator may be one or more selected from the group consisting of sodium formaldehyde sulfoxylate, disodium ethylenediamine tetraacetate, ferrous sulfate, dextrose, sodium pyrophosphate, sodium pyrophosphate anhydrous and sodium sulfate, and among them, one or more selected from the group consisting of dextrose, ferrous sulfate and sodium pyrophosphate may be preferable. The activator may be injected in 0.01 to 1 parts by weight with respect to 100 parts by weight of the sum of the diene-based rubber polymer, the aromatic vinyl-based monomer and the vinyl cyan-based monomer. If the aforementioned range is satisfied, a diene-based graft copolymer having excellent flow index, impact resistance and color characteristics may be prepared.

The water may be ion exchange water or distilled water.

Meanwhile, the graft copolymer prepared through the method for preparing a graft copolymer may have a latex shape. Accordingly, in the method for preparing a graft copolymer according to an embodiment of the present invention, a step of preparing a graft copolymer powder may be further performed after the step S2.

In detail, one or more selected from the group consisting of sulfuric acid, calcium chloride and magnesium sulfate may be injected as a coagulant to the graft copolymer latex obtained in the step S2 to coagulate, and then, the coagulant may be aged, dehydrated, washed and dried to prepare a graft copolymer powder.

The invention claimed is:

1. A polymer coagulant, comprising:
   a conjugated diene-based polymer core; and
   a shell comprising a derived unit from ethyl acrylate and a derived unit from methacrylamide,
   wherein the shell comprises the derived unit from ethyl acrylate and the derived unit from methacrylamide in a weight ratio of 92:8 to 83:17.

2. The polymer coagulant according to claim 1, wherein a weight ratio of the core and the shell is 7:3 to 8:2.

3. The polymer coagulant according to claim 1, wherein a particle diameter of the conjugated diene-based polymer is from 500 to 1500 Å.

4. An enlarged graft copolymer, comprising:
   the polymer coagulant of claim 1;
   a conjugated diene-based polymer;
   a derived unit from a vinyl cyan-based monomer; and
   a derived unit from an aromatic vinyl-based monomer.

5. The enlarged graft copolymer according to claim 4, having a particle diameter of 2500 to 3500 Å.

6. The enlarged graft copolymer according to claim 4, wherein the polymer coagulant is comprised in 1 to 4 parts by weight with respect to 100 parts by weight of the conjugated diene-based polymer.

7. The enlarged graft copolymer according to claim 4, wherein the derived unit from a vinyl cyan-based monomer is comprised in 10 to 25 parts by weight with respect to 100 parts by weight of the conjugated diene-based polymer.

8. The enlarged graft copolymer according to claim 4, wherein the derived unit from an aromatic vinyl-based monomer is comprised in 40 to 60 parts by weight with respect to 100 parts by weight of the conjugated diene-based polymer.

9. A method for preparing an enlarged graft copolymer, the method comprising:
   injecting the polymer coagulant of claim 1 to a conjugated diene-based polymer and enlarging (S1); and
   performing graft polymerization of a vinyl cyan-based monomer and an aromatic vinyl-based monomer to the enlarged conjugated diene-based polymer (S2).

10. The method for preparing an enlarged graft copolymer according to claim 9, wherein a particle diameter of the enlarged conjugated diene-based polymer in step S1 is from 2500 to 3500 Å.

11. The method for preparing an enlarged graft copolymer according to claim 9, wherein the polymer coagulant is injected in 1 to 4 parts by weight with respect to 100 parts by weight of the conjugated diene-based polymer.

* * * * *